May 29, 1951  J. SOCHOR  2,554,962
LOCKING DEVICE FOR VEHICLE BODIES
Filed March 5, 1948
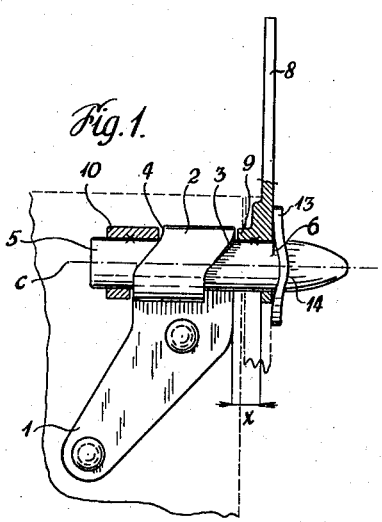
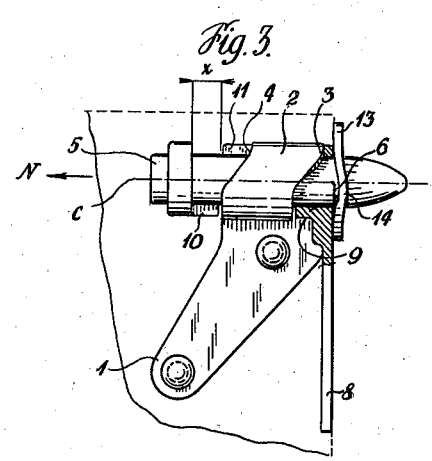
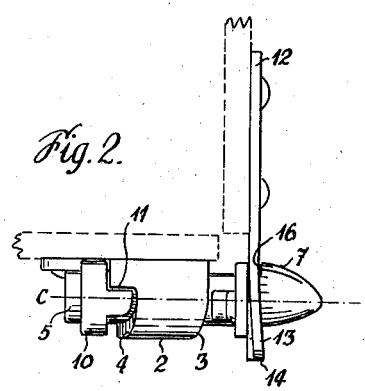
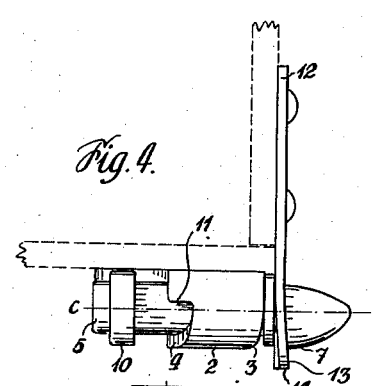
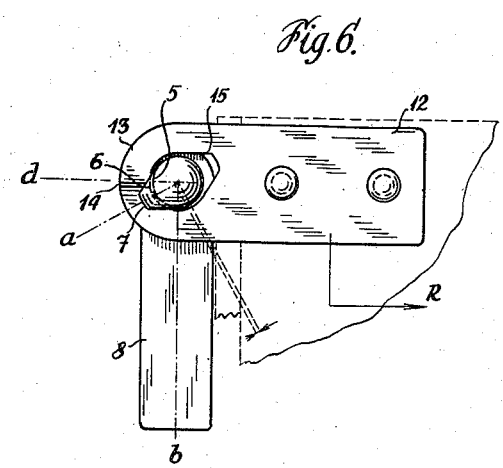
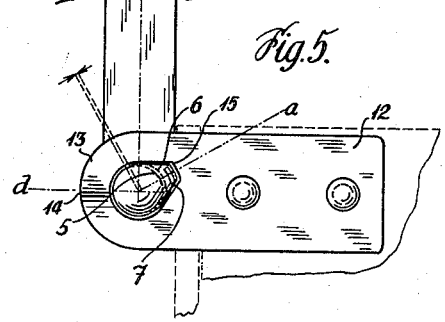
INVENTOR:
Josef Sochor
BY
His Agent.

Patented May 29, 1951

2,554,962

UNITED STATES PATENT OFFICE 2,554,962

LOCKING DEVICE FOR VEHICLE BODIES

Josef Sochor, Prague, Czechoslovakia

Application March 5, 1948, Serial No. 13,215
In Czechoslovakia March 5, 1947

3 Claims. (Cl. 292—58)

The present invention relates to a locking device for the bodies of freight motor cars, trucks, horse-drawn goods wagons, transportation cases adapted to be opened, and the like, and the primary object of the invention is to improve the construction and operation of locking devices of the kind specified so as to achieve a marked technical advance in the art.

An embodiment of the invention is shown by way of example in the accompanying drawings, in which Fig. 1 is a front elevational view, partly in section, of the locking device in its open position;

Fig. 2 is a top plan view of the locking device shown in Fig. 1;

Fig. 3 is a front elevational view, partly in section, of the device in its closed position;

Fig. 4 is a top plan view, similar to Fig. 2, but showing the parts in position of Fig. 3;

Fig. 5 shows the locking lever and connecting hook in the opened position of the locking device; and Fig. 6 is a similar view as that of Fig. 5, but showing the closed position of the locking device.

A bracket 1 which is fastened, for instance, to one of the stationary side walls of the vehicle body, carries a bearing sleeve 2, the end faces of which are formed in part as suitably curved parallel surfaces 3, 4. The connecting hook member comprises a cylindrical part 5 which passes into an eccentric part 6 and terminates in a hook 7, the transverse axis of the hook coinciding with the transverse axis of the eccentric part 6. The cylindrical part 5, which is mounted rotatably and slidably in the bearing 2, has a locking lever 8 rigidly connected thereto, a lug 9 being carried on the lever. The axis $b$ of the lug is so related to the axis $a$ (as shown in Fig. 5) that the lug 9 bears with its front edge against the curved surface 3. Opposite to the lug 9 the cylindrical part has rigidly connected thereto another lug 10 which with its front edge bears against the curved surface 4.

The bracket 12, which in a manner known per se is fastened with one of its ends, for instance, to the movable end wall of the vehicle body, is provided at its free end with a partially curved surface of a suitable shape, the pitch of this surface being opposite to that of the surface 3, 4. The bracket 12 is provided also with an eye 13 having a bulged portion or projection 14 and a shaped aperture 15 which corresponds to the profile of the hook 7 and is threaded on the hook when the movable end wall of the vehicle body is to be closed.

In the opened position of the locking device, as shown in Fig. 1, the locking lever 8 lies at right angles to the longitudinal axis $c$ and to the transverse axis $d$ (Fig. 5) and the lug 9 bears against a straight part of the end face 3 of the bearing 2, and also the lug 10 bears against the parallel straight part of a notch formed by the partially curved surface 4, the lug 10 bearing with its upper surface against the edge 11 (Fig. 2) and thereby retaining the lever 8 exactly in the opened position of the same (Fig. 5), in which the lever 8 lies at a distance $x$ from the bracket 1, the value of the distance $x$ being determined by the pitch of the curved surfaces 3 and 4.

If the movable end wall of the vehicle body has to be closed, the opening 15 of the eye 13 is threaded over the hook 7 and the lever 8 is turned in the direction of the arrow S (Fig. 5). The bevelled surface 16 of the hook 7 slides thereby along the curved surface 13 of the eye, and the lug 10 slides with its front edge along the surface 4, whereby in addition to the rotary motion also a longitudinal displacement of the connecting hook member takes place so that the movable end wall of the vehicle body is drawn against the stationary side wall up to the complete closing of the lever 8 which comes nearer to the bracket 1 by the distance $x$, as shown in Figs. 3 and 4, and finally comes to rest with the lower edge of the lug 9 against the bracket and thereby is secured against turning beyond the closing position. At the same time the movable end wall of the vehicle body is drawn also in the transverse direction against the stationary side wall and the closure is secured against release since during the rotation of the connecting hook the eccentric part 6 acts on the aperture 15 of the eye 13 and the axis $a$ (Fig. 6) comes underneath the transverse axis $d$, so that by the effect of the reaction force R a tilting moment is generated and causes the lower edge of the lug 9 on lever 8 to be drawn against the bracket 1. The sliding movement of the bevelled portion 16 of the hook 7 along the partially curved surface of the eye 13 causes the latter to be forced against the lever 8 so that also between these parts a strong friction is produced, which acts as a friction damper and increases the safety of the lever 8 against undesired opening. The complete closure of the locking device is produced by engagement of the hook 7 behind the projection 14.

In order to release the locking device it is necessary to overcome the friction resistance between the lever 8 and the eye 13, the tilting moment of the reaction force R and the elastic resistance of the projection 14, whereby the lug 9 is caused to slide on the curved surface 3 and produces a longitudinal displacement of the connecting hook member back in a direction opposite to the arrow N.

Through the lever 8 and the eye 13, the movable vehicle body wall is forced out and at the same time is released by the eccentric part 6 also in the transverse direction. The hook 7 slides with its bevelled portion 16 over the curved part of the eye 13 so that when the lug 10 comes in contact with the edge 11, the hook 7 has been turned relatively to the shaped aperture whereby opening of the movable end wall of the vehicle body is made possible.

What I claim is:

1. In a lock mechanism, designed for releasably securing a movable closure member to a body, in combination: a keeper plate mounted on said closure member and extending therefrom and having an elongated opening including an arcuate portion merging with a converging portion; a bearing sleeve mounted on said body, a bolt journalled in said bearing sleeve, and being slidable in said bearing and revoluble in opposite directions between a locking and a release position, and comprising a hook rigidly connected near one end of said bolt and movable therewith and being similar in contour to said opening though sufficiently smaller for passage therethrough when said bolt is in the release position, a handle structure secured to said bolt opposite said hook and spaced therefrom for a distance comparable to the thickness of said keeper plate to engage the latter between the said structure and the said hook, an eccentric on said bolt extending between said hook and said handle and positioned to pass through said converging portion of said opening in said release position of said bolt, and to abut against the contour of said arcuate portion of said opening in the locking position of said bolt for imparting movement transverse of the bolt axis to said keeper, cam and cam follower means intermediate said bolt and said sleeve for transforming rotational movement of said bolt into endwise sliding movement thereof, and means for limiting the rotational movement of the bolt between the said two positions.

2. In a lock mechanism, as claimed in claim 1, together with, said keeper plate having a projection adjacent said arcuate portion of said opening off-set laterally from the center thereof and extending for a distance sufficiently small to pass said hook under force and sufficiently large to prevent accidental passage of said hook, and said hook including a part being positioned substantially in registry with said center of said arcuate opening portion in said locking position of said bolt, whereby said hook will pass said projection during movement to the locking position for closure pressure against the same, and will be located behind the same in locking position to restrain accidental release therefrom.

3. In a lock mechanism, as claimed in claim 2, the axis of elongation of said opening being at an angle to the direction of transverse movement imparted to said keeper by said eccentric in locking position, and the said projection of the keeper plate being positioned in alignment with the said direction.

JOSEF SOCHOR.

REFERENCES CITED

The following references are of record in the file of this patent:

UNITED STATES PATENTS

| Number | Name | Date |
| --- | --- | --- |
| 379,242 | North | Mar. 13, 1888 |
| 549,924 | Leistner et al. | Nov. 19, 1895 |
| 704,014 | Espitallier | July 8, 1902 |